(12) United States Patent
Boyer et al.

(10) Patent No.: US 9,745,110 B2
(45) Date of Patent: Aug. 29, 2017

(54) 360° POUR BEVERAGE CONTAINER

(71) Applicant: IGNITE USA, LLC, Chicago, IL (US)

(72) Inventors: Christopher T. Boyer, Oak Park, IL (US); Robert C. Coon, Chicago, IL (US); Bryan Washburn, Buffalo Grove, IL (US); Paul D. Hurley, Libertyville, IL (US)

(73) Assignee: IGNITE USA, LLC, Chicago, IL (US)

( * ) Notice: Subject to any disclaimer, the term of this patent is extended or adjusted under 35 U.S.C. 154(b) by 0 days.

(21) Appl. No.: 14/863,386

(22) Filed: Sep. 23, 2015

(65) Prior Publication Data

US 2017/0081090 A1 Mar. 23, 2017

(51) Int. Cl.
*B65D 47/12* (2006.01)

(52) U.S. Cl.
CPC .................. *B65D 47/121* (2013.01)

(58) Field of Classification Search
CPC .................................... B65D 47/121
USPC .................... 222/545, 563, 568, 1
See application file for complete search history.

(56) References Cited

U.S. PATENT DOCUMENTS

| | | | | |
|---|---|---|---|---|
| 2,735,566 A | * | 2/1956 | Bramming | A47J 41/0027 222/545 |
| 3,776,433 A | * | 12/1973 | De Treitas | B65D 47/246 222/519 |
| 6,102,244 A | | 8/2000 | Kuwano et al. | |
| 6,662,978 B2 | * | 12/2003 | Lin | B65D 41/0442 222/509 |
| 6,702,138 B1 | | 3/2004 | Bielecki et al. | |
| 6,736,295 B2 | * | 5/2004 | Lin | A47J 41/0016 215/13.1 |
| 8,272,532 B2 | | 9/2012 | Michaelian et al. | |
| 9,493,274 B2 | * | 11/2016 | Ledun | B65D 39/0064 |
| 2002/0108959 A1 | | 8/2002 | Pollock | |
| 2010/0200602 A1 | | 8/2010 | Chan | |
| 2010/0237078 A1 | | 9/2010 | Lentz et al. | |
| 2011/0198352 A1 | | 8/2011 | Lown et al. | |
| 2014/0166654 A1 | | 6/2014 | Lane | |

OTHER PUBLICATIONS

Chantal Travel Mug, www.chantal.com/chantal-travel-mug.html, retrieved from the internet Sep. 25, 2015.
Cool Gear 15 oz. Monarch 360 Coffee Mug, www.sears.com/cool-gear-15-oz-monarch-360-coffee-mug/p-SPM11713653415, retrieved from the internet Sep. 25, 2015.
Cuisipro: The Click-n-Sip is a Commuter's Must-Have Travel Mug, www.cuisipro.com/en/article/Click-n-Sip.html, retrieved from the internet Sep. 25, 2015.

(Continued)

*Primary Examiner* — Donnell Long
(74) *Attorney, Agent, or Firm* — Marshall, Gerstein & Borun LLP (57) ABSTRACT

A beverage container comprises a container body defining an opening and having an interior volume and a 360° pour spout assembly removably coupled to the container body. The pour spout assembly comprises an outer plug and an inner plug at least partially received within the outer plug, the outer plug being removably coupled to the container body and the inner plug being vertically displaceable along a longitudinal container body axis and removably coupled to the outer plug.

20 Claims, 9 Drawing Sheets

(56) References Cited

OTHER PUBLICATIONS

JOEmo 13 oz. Stainless—www.highwave.com/product-p/j1400.htm, retrieved from the internet Sep. 25, 2015.
OXO Good Grips 360 LiquiSeal Travel Mug, www.espressoplanet.com/coffee-and-espresso/oxo-good-grips-360-liquiseal-travel-mug.html, retrieved from the internet Sep. 25, 2015.
Thermos Vacuum Insulated Travel Mug 360oSip Top—www.baldmountaincoffee.com/page/BMCC/PROD/Thermos_Nissan/00002426 retrieved from the internet Sep. 25, 2015.
Toolbar Insulated Travel Mug, www.small-order.hktdc.com/small-order-suppliers-products/Insulated-Travel-Mug/en/1X00OT8D/2400546/, retrieved from the internet Sep. 25, 2015.
Trudeau Executive Board Room Travel Coffee or Tea Mug, www.cappojim.com/Trudeau-Executive-Board-Room-Travel-Coffee-or-Tea-Mug-16-oz.—Black.html, retrieved from the internet Sep. 25, 2015.
Trudeau Vision 14-Ounce Stainless Steel Travel Mug, Metallic, www.amazon.com/Trudeau-Vision-14-Ounce-Stainless-Metallic/dp/B003LJX0G8, retrieved from the internet Sep. 25, 2015.

* cited by examiner

360° POUR BEVERAGE CONTAINER

TECHNICAL FIELD

The present disclosure relates generally to a beverage container, and more specifically to a travel beverage container with a 360° pour spout.

BACKGROUND

Portable beverage containers, such as bottles, thermoses, and the like, are commonly used by people who want to temporarily store a beverage such as water, coffee, tea, or other liquid and then consume the beverage at a later time. Such portable beverage containers often lack guided or directed pour features and instead rely simply upon the upper rim or mouth of the container to direct or guide the flow of the beverage as the beverage is poured. As a result, it can be challenging for consumers to use such portable beverage containers, particularly in environments where controlled pouring is desirable.

BRIEF DESCRIPTION OF THE DRAWINGS

The disclosure may be best understood by reference to the following description taken in conjunction with the accompanying drawings, in which.

DETAILED DESCRIPTION

While a beverage container according to the present disclosure is susceptible of embodiments in many different forms, there are shown in the drawings and will herein be described in detail preferred embodiments according to the disclosure with the understanding that the disclosure is to be considered as an exemplification of the principles of the claimed invention and thus is not intended to limit the broad aspects of the claimed invention to the specific embodiments illustrated.

A beverage container with a 360° pour spout assembly having open (or pouring) and closed (or sealed) orientations is disclosed herein. The 360° pour spout assembly disclosed herein provides a guided flow path that facilitates easy and controlled pouring (when in the open orientation) and prevents spills (when in the closed orientation). Because the 360° pour spout assembly disclosed herein provides a guided flow path that completely surrounds an opening in the container, a consumer can pick up and pour a beverage from the beverage container (when the pour spout assembly is in the open orientation) without needing to first arrange the beverage container in a specific orientation. In addition, thorough cleaning of the beverage container can be readily accomplished because the pour spout assembly is removably coupled to a beverage container body and an inner plug of the pour spout assembly is removably coupled to an outer plug of the pour spout assembly, such that the inner and outer plug components which cooperatively provide the guided flow path for pouring from the container are separable both from one another and from the container body and thus do not obstruct one another during cleaning.

Figure 1:
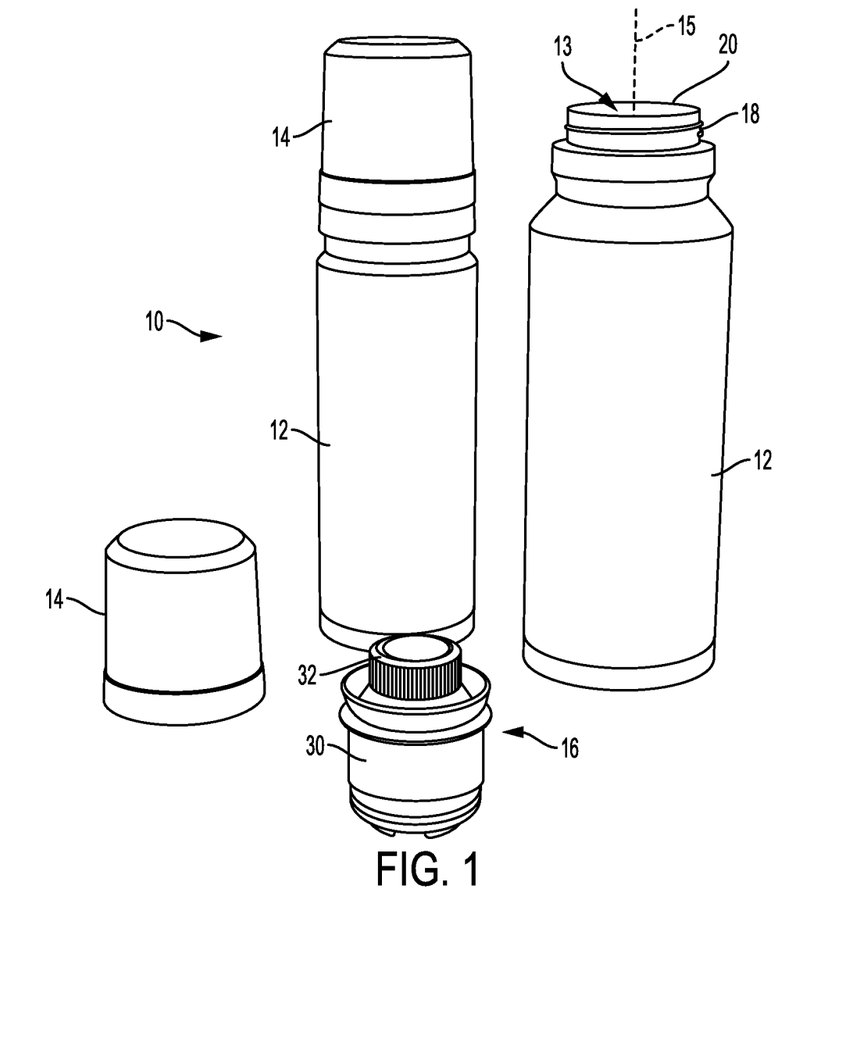
FIG. 1 is a perspective view of two beverage containers, each having a 360° pour spout according to the disclosure.
Figure 2:
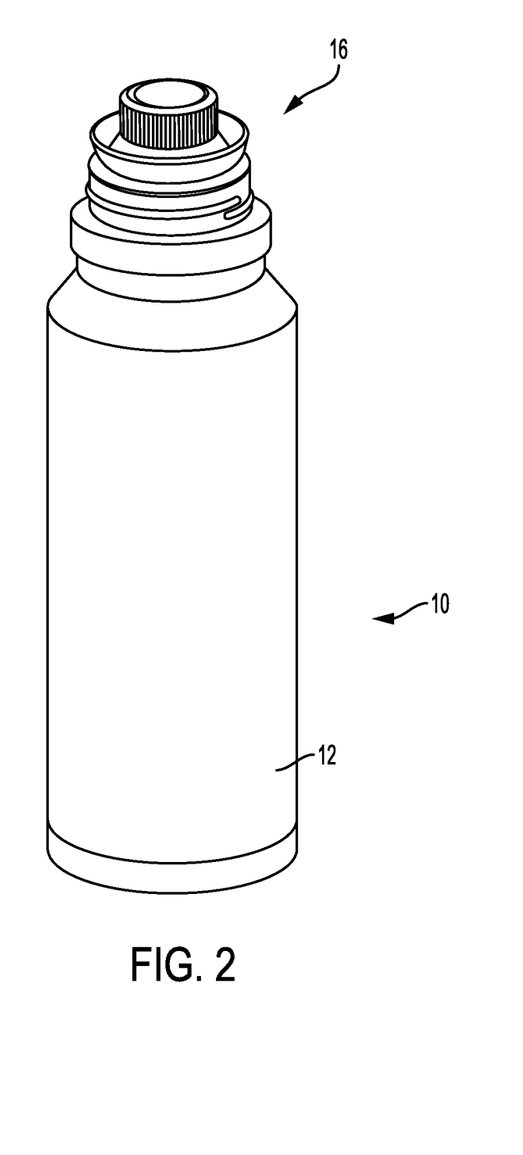
FIG. 2 is a top perspective view of a beverage container having a 360° pour spout according to the disclosure.
Figure 3:
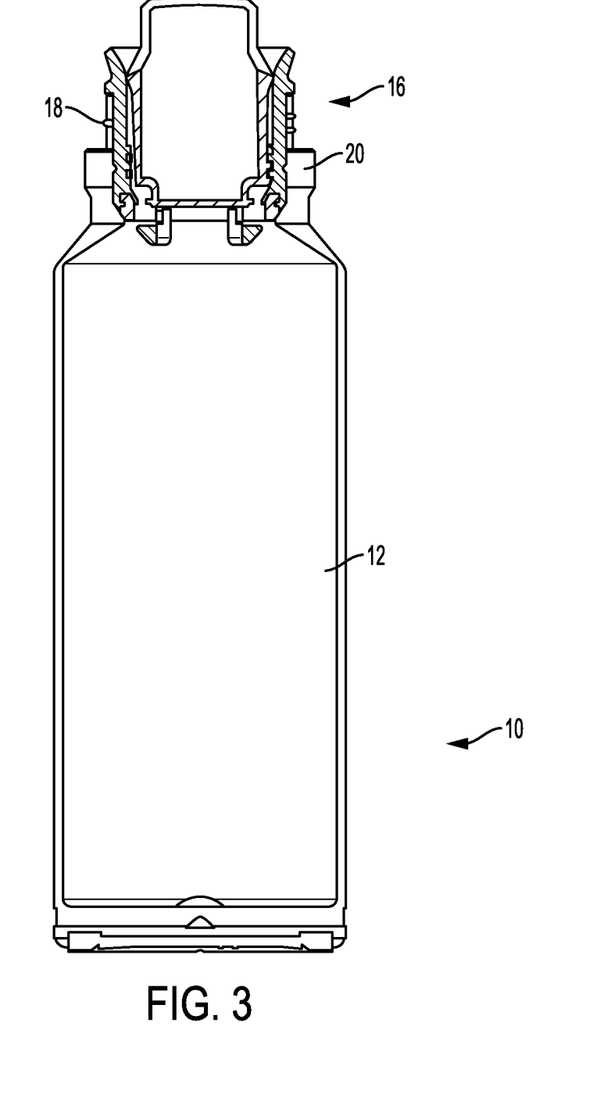
FIG. 3 is a cross-sectional front elevation view of the beverage container of FIG. 2.

Referring now to the figures, and specifically to FIGS. 1 and 2, there is shown a beverage container 10 generally comprising a container body 12, an outer cup assembly 14, and a pour spout assembly 16. The container body 12 defines an opening 13 providing access to an interior volume. The container body 12 generally has a longitudinal container body axis 15 extending through a center of the container body 12 in a longitudinal direction parallel to a length of the container body 12. As shown in FIG. 3, the container body 12 is a double walled container, but single walled containers are also contemplated. The double walls of container body 12 are useful in that they may include an insulative material, such as foam, or a vacuum between the walls, to improve the insulative performance of the beverage container 10. As illustrated, the container body 12 further includes external threads 18 at a spout end 20 which mate with corresponding internal threads (not shown) on an inner surface of the outer cup assembly 14 to removably couple the outer cup assembly 14 to the container body 12. The spout end 20 of the container body 12 also has internal threads 24 on an inner surface thereof that mate with corresponding external threads 26 on the pour spout assembly 16 to removably couple the pour spout assembly 16 to the container body 12 (see also FIGS. 3 and 8). The outer cup assembly 14 can be removably coupled to the container body 12 after the spout assembly 16 is removably coupled to the container body, i.e., the outer cup assembly 14 can be mounted over the spout assembly 16 and coupled to the container body once the spout assembly 16 has been coupled to the container body 12. The container body 12 may be manufactured from various materials including but not limited to metals, plastics, and combinations thereof. Stainless steel and aluminum are representative materials for manufacturing the container body 12.

As shown in FIGS. 4-9, the pour spout assembly 16 comprises an outer plug 30 and an inner plug 32. The pour spout assembly 16 has an annular pour spout 34 at a first end 36 of the outer plug 30 (the first end 36 generally corresponding to a top portion of the outer plug 30). In the illustrated embodiment, the annular pour spout 34 is provided by an outwardly flared inner wall section of the outer plug 30, with the outwardly flared inner wall section terminating at a rim 37 of the annular pour spout 34. The annular pour spout 34 can also be provided by a frustoconical or another suitably shaped annular wall section. When the pour spout assembly 16 is coupled to the container body 12, the annular pour spout 34 extends beyond a top surface of the opening 13 of the container body 12. The outer plug 30 and the inner plug 32 may be manufactured from various materials including but not limited to metals, plastics, and combinations thereof. Generally, the outer plug 30 and inner plug 32 are manufactured from thermoplastic materials such as polypropylene, polyethylene, and the like.

Figure 5:
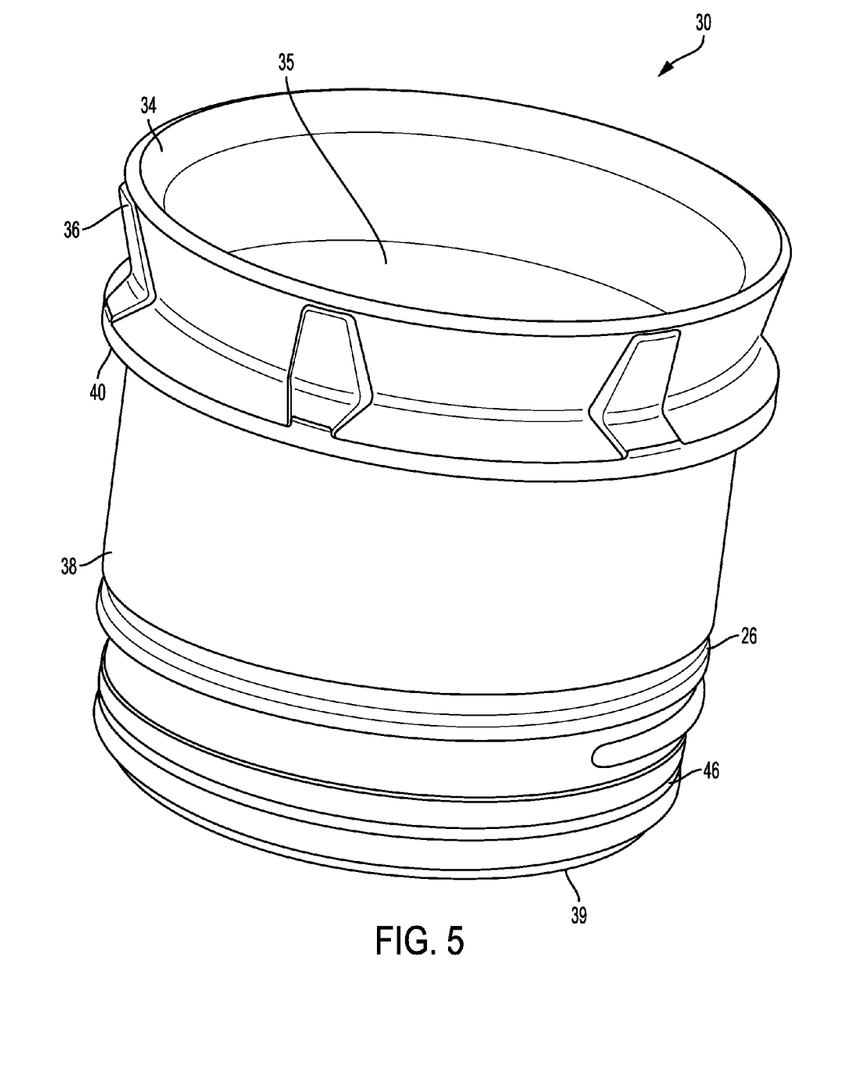
FIG. 5 is a top perspective view of an outer plug according to the disclosure.
Figure 6:
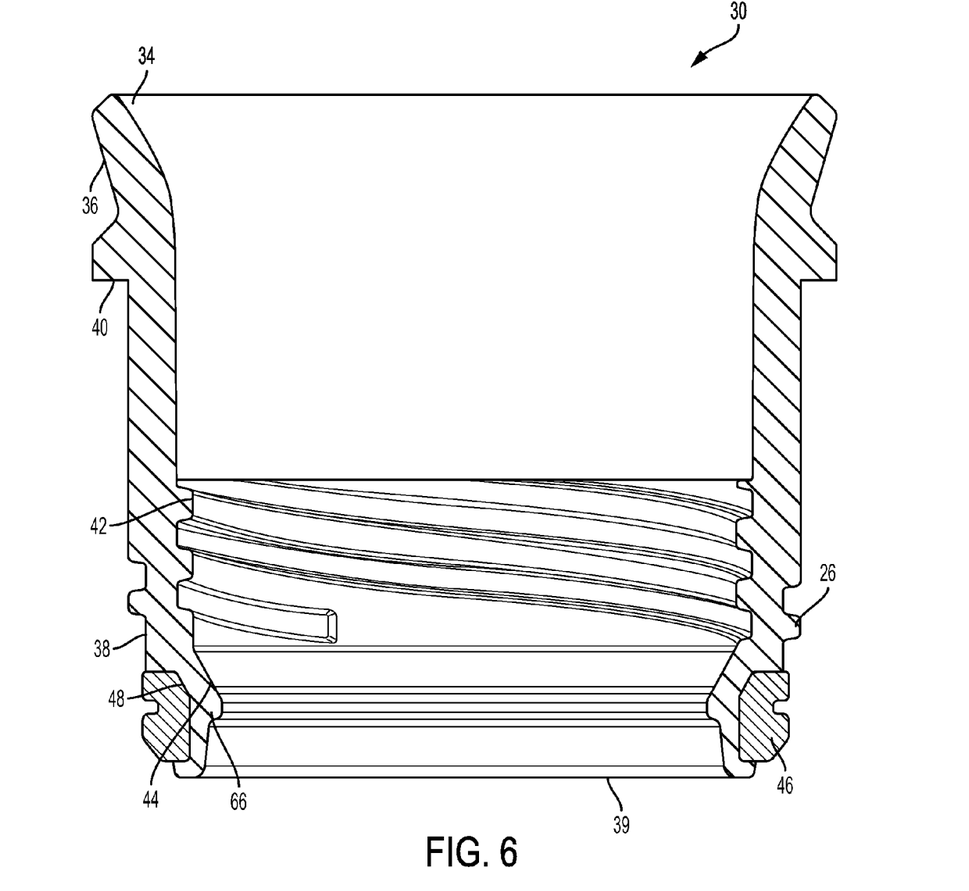
FIG. 6 is front cross-sectional view of the outer plug of FIG. 5.
Figure 7:
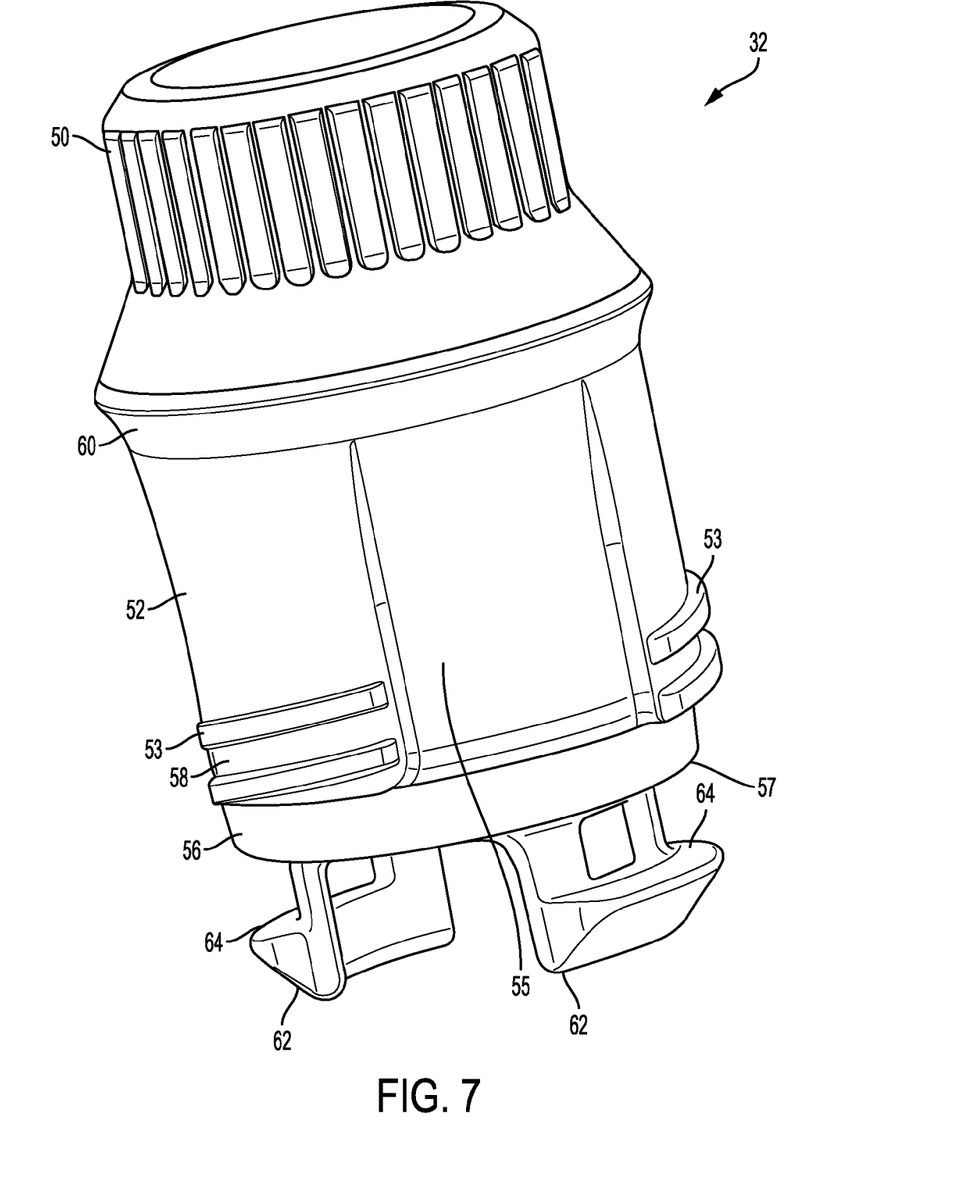
FIG. 7 is a top perspective view of an inner plug according to the disclosure.
Figure 8:
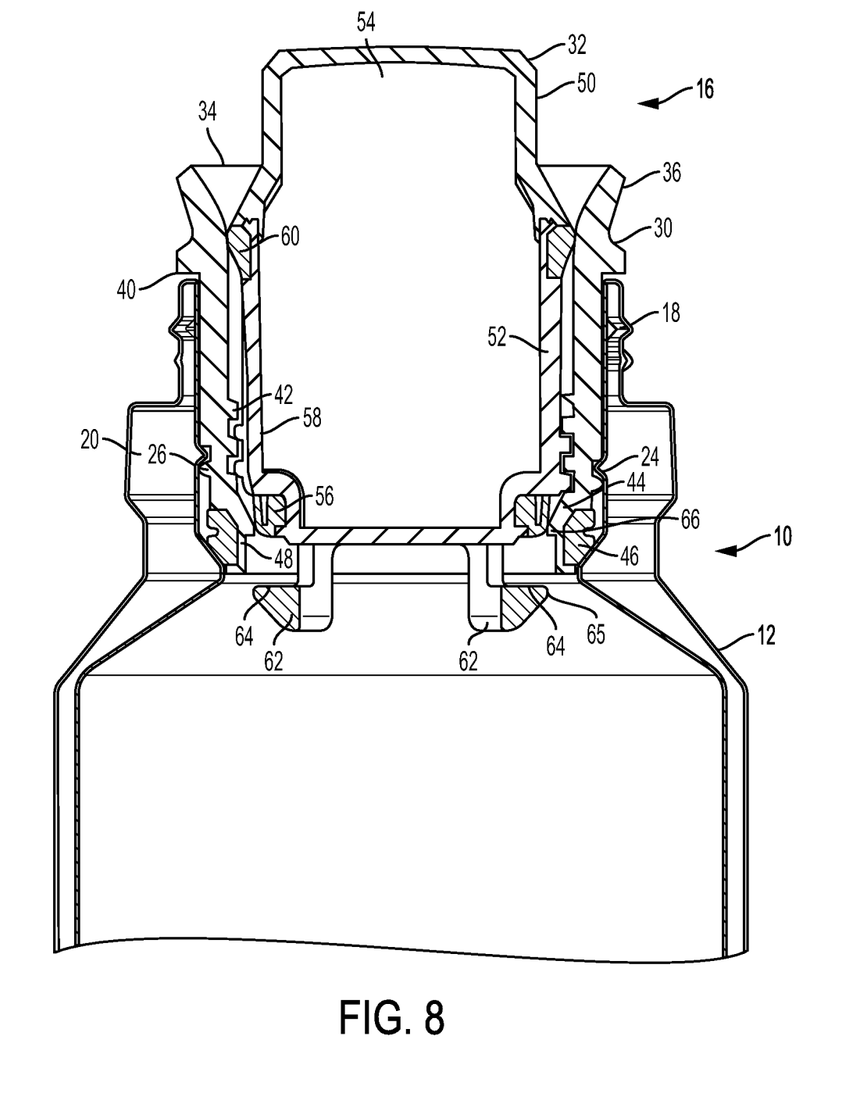
FIG. 8 is a front partial cross-sectional view of a beverage container according to the disclosure illustrating the 360° pour spout in a closed (or sealed) orientation.
Figure 9:
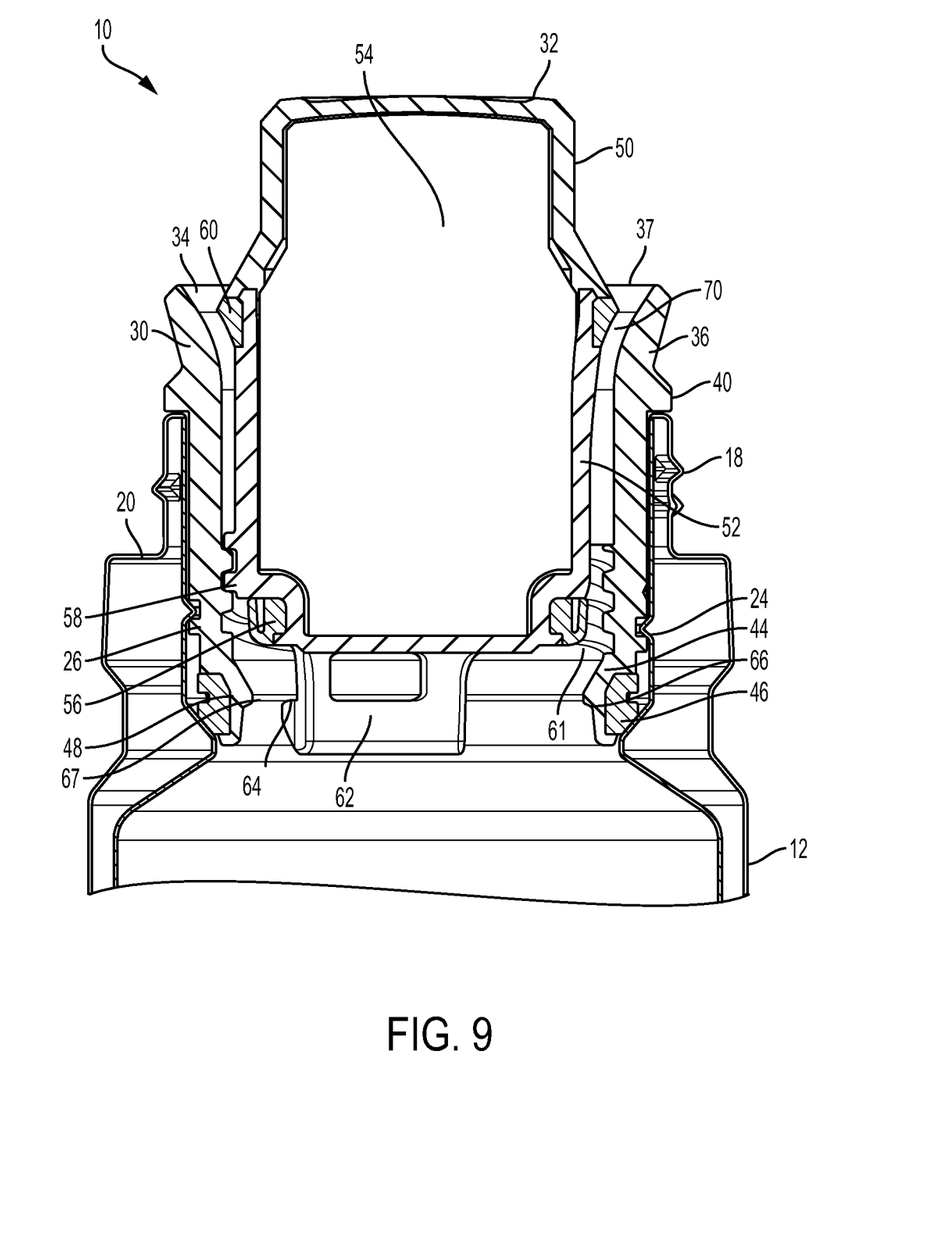
FIG. 9 is a front partial cross-sectional view of the beverage container shown in FIG. 8 illustrating the 360° pour spout in an open (or pouring) orientation.

As shown in FIG. 5, the outer plug 30 is generally cylindrical. The outer plug 30 has external threads 26 toward a second end 38 thereof (the second end 38 generally corresponding to a bottom portion of the outer plug 30). As explained above, the external threads 26 assist in removably coupling the pour spout assembly 16 to the container body 12. The outer plug 30 also has an external rib 40 adjacent the first end 36 to assist in seating the pour spout assembly 16 on the container body 12. A central opening 35 of the outer plug 30 is generally defined by a rim 37 of the annular pour spout 34. In use, when the inner plug 32 is coupled to the outer plug 30, as shown in FIGS. 3, 8 and 9, the inner plug 32 is partially disposed in the central opening 35 of the outer plug 30. As shown in FIGS. 6 and 7, the inner surface of the outer plug 30 contains threads 42 which mate with corresponding threads 53 on the inner plug 32 to removably couple the inner plug 32 to the outer plug 30 (see also FIGS. 8 and 9). The threaded engagement between the inner plug 32 and the outer plug 30 allows the inner plug 32 to be vertically displaceable within the outer plug 30 along the longitudinal container body axis 15 and to thereby form a sealing lid for the beverage container body 12, capable of moving between open (or pouring) and closed (or sealed) orientations as described in further detail below. The threaded engagement also can translate torque applied to the inner plug 32 into a radial component capable of causing the inwardly radially deflectable retaining members 62 to radially deflect inwardly towards the center longitudinal axis 15.

Disposed on an inner surface of the outer plug 30 adjacent the second or bottom end 38 is a sealing wall 44 for sealing the inner plug 32 to the outer plug 30 when the pour spout assembly 16 is in the closed orientation. As best shown in FIG. 6, in the illustrated embodiment, the sealing wall 44 is provided by an inwardly flared inner sealing wall (i.e., flared inwardly towards the center longitudinal axis 15, when the spout assembly 16 is coupled to the container body 12). The sealing wall 44 can also be provided by a frustoconical or another suitably shaped sealing wall adjacent the second end 38 of the outer plug 30. As illustrated, a top tapered portion of the sealing wall 44 is distal to a bottom surface 39 of the second end 38 and a bottom inwardly flared portion of the sealing wall 44 is proximate the bottom surface 39 of the second end 38. An outer plug seal 46 (see FIG. 6) is seated in a seal seat 48 on an outer surface of the outer plug 30 proximate the bottom surface 39 of the outer plug 30 to assist in sealing the pour spout assembly 16 to the container body 12, when the pour spout assembly 16 is in the closed orientation. The outer plug seal 46 may be made of a resilient seal material.

As best shown in FIGS. 7 and 8, the inner plug 32 preferably comprises an inner plug top portion 50 and an inner plug body 52, which may be separate components that are connected together or they may be integral. The inner plug 32 also may have an insulative material 54, such as foam, in its inner core to provide additional insulative properties to the inner plug 32.

In one embodiment, the inner plug 32 has two seals, the first being an inner plug seal 56 disposed on an exterior surface of the inner plug 32 proximate a bottom surface 57 thereof. As described in further detail below, the inner plug seal 56 generally seals the area between the inner plug 32 and the outer plug 30 when the inner plug 32 is in the closed orientation, thereby preventing undesired fluid flow from the beverage container 10 (e.g., a beverage from inadvertently being inadvertently spilled, etc.). In an exemplary embodiment, the inner plug seal 56 is made of a resilient seal material.

The second seal of the inner plug 32 is a residual seal 60, generally residing at the joint between the top portion 50 and the body 52 of the inner plug 32. The residual seal 60 may be made of the same material as the inner plug body 52, or may be made of a resilient seal material (like the inner plug seal 56). In the embodiment shown in FIG. 7, the residual seal 60 is provided by an outwardly flared (i.e., away from the outer surface of the inner plug 32) annular seal. The residual seal 60 can also be provided by a frustoconical or another suitably shaped seal. As illustrated, a top flared portion of the residual seal 60 is proximate the top portion 50 of the inner plug 32 and a bottom tapered portion is distal to the top portion 50. Various resilient materials can be used to manufacture the outer plug seal 46, the inner plug seal 56, and the residual seal 60, including but not limited to silicones, rubbers, and thermoplastic elastomers.

In general, as best shown in FIG. 7, two or more sets of partial threads 53 are provided on an exterior surface of the inner plug 32. One or more channel sections 55 are also provided on the exterior surface of the inner plug 32, the one or more channel sections 55 being disposed between the sections carrying first and second sets of partial threading 53. The channel sections 55 are recessed at least relative to the sections of the inner plug 32 that carry the partial threading 53. The inner plug 32 also includes one or more retaining members 62 for preventing undesired/inadvertent separation of the inner plug 32 from the outer plug 30 and/or providing a positive indication to the consumer upon opening of the pour spout assembly 16 that the spout assembly 16 is in the fully open orientation that allows pouring.

Figure 4:
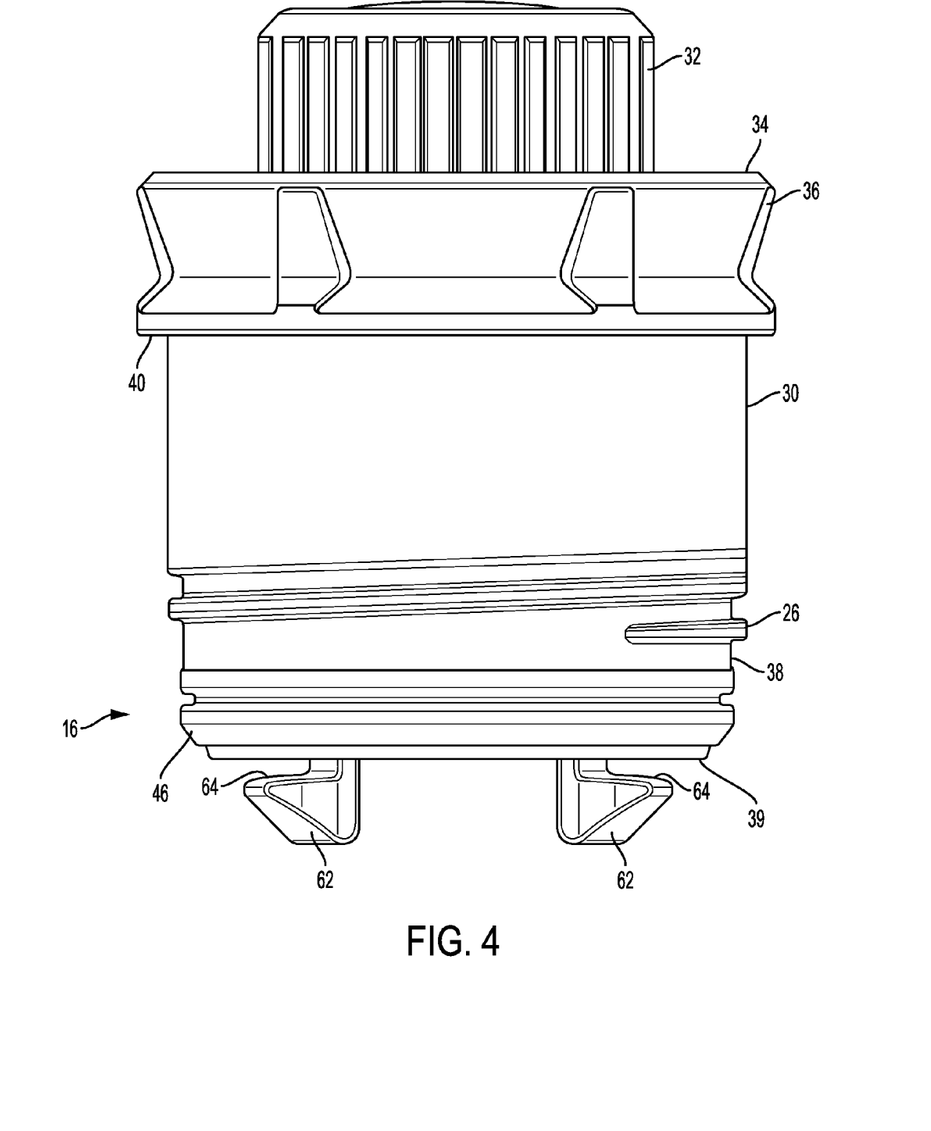
FIG. 4 is a front elevation view of one embodiment of a 360° pour spout assembly according to the disclosure, the 360° pour spout assembly including an outer plug and an inner plug.

As shown in FIGS. 4, 7 and 8, a plurality of retaining members 62 generally extend or protrude from the bottom of the inner plug body 52. In one embodiment, there are two retaining members or spring arms 62, each with stop walls 64 for retaining the inner plug 32 within the outer plug 30. As shown, retaining members 62 engage a stop rib 66 on an inner surface of the outer plug 30 when the inner plug 32 is moved to its fully open or pouring orientation. In one embodiment, with reference to FIGS. 6, 8 and 9, the stop rib 66 is provided by a circumferential stop rib on the inner surface of the outer plug 32 proximate a bottom surface thereof. The retaining members 62 are inwardly radially deflectable, for example, upon application of torque to the inner plug, as explained in further detail below.

In use, and with reference to FIGS. 8 and 9, the outer plug 30 and the inner plug 32 together provide the pour spout assembly 16 and form a sealing lid for the beverage container body 12 capable of moving between open (or pouring) and closed (or sealed) orientations. FIG. 8 illustrates the pour spot assembly 16 in the closed orientation and FIG. 9 illustrates the pour spot assembly 16 in the open orientation. In both orientations, both the inner plug 32 and the outer plug 30 of the pour spout assembly 16 are coupled to the container body 12. In both orientations, the inner plug 32 is rotationally received within the central opening 35 of the outer plug 30, such that the inner plug 32 is partially disposed in the central opening 35 of the outer plug 30. The outer plug 30 is twisted or rotated into the central opening 13 of the beverage container body 12 to couple the outer plug 30 to the beverage container body 12. After coupling the outer plug 30 to the container body 12, the inner plug 32 is already or can subsequently be rotated into and thereby partially disposed within and coupled to the outer plug 30.

As shown in FIG. 8, the outer plug seal 46 seals against an inner surface of the container body 12 when the pour spout assembly 16 is fully coupled to the container body 12 when the external threads 26 on the pour spout assembly 16 and the corresponding internal threads 24 of the container body 12 are mated such that further engagement is not possible. Again with reference to FIG. 8, the inner plug 32 is coupled to the outer plug 30 when the threads 42 on the inner surface of the outer plug 30 and corresponding sets of threads 53 on the outer surface of the inner plug 32 are mated. When the inner plug 32 is in the closed orientation, it is coupled to the outer plug 30 such that further engagement is not possible as is shown FIG. 8. In the closed orientation, the sealing wall 44 of the outer plug 30 is placed into sealing engagement with the inner plug seal 56 of the inner plug 32 such that a fluid from the container body 12 cannot flow into the plug assembly 16. In the closed orientation, the beverage container 10 is sealed or closed because the inner plug seal 56, which is located toward a bottom end 58 of the inner plug body 52, seals against the inwardly flared sealing wall 44 of the outer plug 30. As a result, the closed orientation can prevent liquid from being spilled or poured from the beverage container 10.

The residual seal 60 may also engage and seal against an inner surface of the outer plug 30 and thereby provide a secondary sealing interaction when the inner plug 32 is positioned in the closed orientation shown in FIG. 8. As a result, the residual seal 60 can prevent liquid from flowing out of the spout assembly 16 that may be beyond a first sealing interaction attributable to the inner plug seal 56 sealing against the inwardly flared sealing wall 44 of the outer plug 30. In addition, because the residual seal 60 can essentially trap air between the residual seal 60 and the inner plug seal 56, it can enhance the insulation of beverages contained in the beverage container 10.

To release liquid from the container 12 and place the pour spout assembly 16 in the open orientation shown in FIG. 9, the inner plug 32 of the beverage container shown in FIG. 8 is rotated, causing the inner plug 32 to be vertically displaced and move slightly upwardly (away from the container body 12) based on the threaded connection between the inner plug 32 and the outer plug 30. As a result of the inner plug 32 becoming vertically displaced, the inner plug seal 56 and the residual seal 60 are no longer in sealing engagement with the outer plug sealing wall 44 and the pour spout 34. As shown, the inner plug seal 56 disposed on the exterior surface of the inner plug 32 is separated from the outer plug sealing wall 44 to provide an annular ring flow path 61 between the inner wall of the outer plug 30 and the outer surface of the inner plug 32 that is in fluid communication with the interior volume of the beverage container 10. The annular ring entry flow path 61 permits fluid to enter and ultimately flow out of the pour spout assembly 16. In the open orientation, liquid can travel from the annular ring flow path 61 through a flow path (not shown) defined between the channel sections 55 of the inner plug 32 and an interior surface of the outer plug 30 and ultimately out a flow path 70 defined by the inner plug residual seal 60 and the annular pour spout 34. Liquid can then be poured out of the container body 12 by flowing between the outer wall of the inner plug 32 and the inner wall of the outer plug 30. Liquid can flow out the pour spout assembly 16 anywhere in the 360° pour area between the inner plug 32 and the outer plug 30. In cooperation, the outwardly flared pour spout 34 and the correspondingly contoured exterior surface of the residual seal 60 provide a fluid flow path allowing controlled and precise pouring from the beverage container 10 when the inner plug 32 is in the open orientation.

In the open orientation shown in FIG. 9, the inner plug 32 remains retained within the outer plug 30 of the pour spout assembly 16 because the stop walls 64 of the two retaining members 62 engage the stop rib 66 on the inner surface of the outer plug 30 when the inner plug 32 is rotated out of the outer plug 30. The engagement of stop walls 64 with the stop rib 66 creates a positive stop for the consumer upon positioning the pour spout assembly 16 in the fully open orientation. The positive stop provides consumers with feedback that the pour spout assembly 16 is in the fully open orientation (allowing pouring) because a tactile perception is apparent to the user upon rotating the inner plug 32 relative to the outer plug 30 and placing the stop walls 64 of the inner plug 32 retaining members 62 in contact or engagement with the stop rib 66 of the outer plug 60. The interaction between the stop walls 64 and the stop rib 66 can be overcome by causing the retaining members 62 to inwardly deflect and thereby become disengaged with the stop rib 66. In one embodiment, the stop walls 64 of retaining members 62 are configured to create a radial force causing deflection of the retaining members 62 upon application of an axial force. For example, an axial force can be translated into a radial component by interaction of mating surfaces provided on the stop wall 64 and the stop rib 66. In one exemplary embodiment, the stop walls 64 include an angled engagement surface 65 that mates with the stop rib 66 of the outer plug 30. The circumferential stop rib 66 can also include an angled or curved surface 67 at a point where the stop walls 64 and stop rib 66 are engaged after placing the pour spout assembly 16 in the fully open orientation. The retention arm angled engagement surface 65 and the stop rib angled or curved surface 67 generally have mating contoured angles between about 5 and about 20 degrees, for example about 10 degrees, relative to the center longitudinal container body axis 15.

Generally speaking, the interaction between the mating surfaces provided on the stop wall 64 and the stop rib 66 can be overcome when sufficient torque is applied to the inner plug 32. The threaded connection between the inner plug 32 and the outer plug 30 translates the torque applied to the inner plug 32 into an axial force and that axial force is further translated into a radial component by interaction of mating contoured surfaces provided on the stop wall 64 and the stop rib 66. The torque needed to overcome the interaction between the mating surfaces provided on the stop wall 64 and the stop rib 66 should be great enough to provide the consumer with a positive stop (i.e., a consumer applying a normal amount of torque to rotate the inner plug 32 out of the outer plug 30 would not overcome the positive stop without applying additional torque). On the other hand, the torque needed to overcome the interaction between the mating surfaces provided on the stop wall 64 and the stop rib 66 should not be difficult for some consumers to apply. Balancing these factors, the mating surfaces provided on the stop wall 64 and the stop rib 66 can be configured such that between about 0.5 newton meters and about 3 newton meters of torque is required to cause the retaining members 62 to inwardly deflect after engagement of the stop walls 64 with the stop rib 66 while providing the consumer with a positive stop. Once the interaction between the mating surfaces provided on the stop wall 64 and the stop rib 66 is overcome, the inner plug 32 can be completely removed from the outer plug 30 to facilitate cleaning of the inner plug 32 and the outer plug 30.

Several alternative examples have been described and illustrated herein. A person of ordinary skill in the art would appreciate the features of the individual embodiments, and the possible combinations and variations of the components. A person of ordinary skill in the art would further appreciate that any of the examples could be provided in any combination with the other examples disclosed herein. Additionally, the terms "first," "second," "third," and "fourth" as used herein are intended for illustrative purposes only and do not limit the embodiments in any way. Further, the term "plurality" as used herein indicates any number greater than one, either disjunctively or conjunctively, as necessary, up to an infinite number. Additionally, the word "including" as used herein is utilized in an open-ended manner.

While the foregoing has described what are considered to be the best mode and/or other examples, it is understood that various modifications may be made therein and that the subject matter disclosed herein may be implemented in various forms and examples, and that the teachings may be applied in numerous applications, only some of which have been described herein. It is intended by the following claims to claim any and all applications, modifications and variations that fall within the true scope of the present teachings.

What is claimed is:

1. A beverage container comprising:
   a container body defining an opening and having an interior volume; and,
   a 360° pour spout assembly removably coupled to the container body, the pour spout assembly providing access to the interior volume and having open and closed orientations, the pour spout assembly comprising an outer plug and an inner plug at least partially received within the outer plug,
   the outer plug being removably coupled to the container body; and
   the inner plug being displaceable along a longitudinal container body axis and removably coupled to the outer plug, the inner plug further comprising one or more retaining members extending from a bottom surface of the inner plug.

2. The beverage container according to claim 1, further comprising a circumferential stop rib on an inner surface of the outer plug proximate a bottom surface thereof.

3. The beverage container according to claim 1, wherein the one or more retaining members is inwardly radially deflectable.

4. The beverage container according to claim 1, wherein in the closed orientation, threads on an inner surface of the outer plug are engaged with threads on an outer surface of the inner plug.

5. The beverage container according to claim 1, wherein in the open orientation, the one or more retaining members extending from a bottom surface of the inner plug is engaged with a circumferential stop rib on an inner surface of the outer plug.

6. The beverage container according to claim 5, wherein the one or more retaining members is inwardly radially deflectable upon application of torque to the inner plug.

7. The beverage container according to claim 5, wherein the one or more retaining members is inwardly radially deflectable upon application of about 0.5 newton meters to about 3 newton meters of torque to the inner plug.

8. The beverage container according to claim 5, further comprising a contact surface for engaging the circumferential stop rib on the one or more retaining members, the contact surface being angled relative to the longitudinal container body axis.

9. The beverage container according to claim 1, further comprising a plurality of sets of partial threading on an outer surface of the inner plug.

10. The beverage container according to claim 9, further comprising one or more channel sections on the outer surface of the inner plug, the one or more channel sections being disposed between first and second sets of partial threading.

11. The beverage container according to claim 10, wherein the channel sections are recessed relative to sections carrying the first and second sets of partial threading.

12. The beverage container according to claim 1, the outer plug further comprising an annular and outwardly flared pour spout extending beyond a top surface of the opening.

13. The beverage container according to claim 1, further comprising an inwardly flared sealing wall disposed on an inner surface of the outer plug proximate a bottom surface thereof.

14. The beverage container according to claim 13, further comprising a seal disposed on an exterior surface of the inner plug proximate a bottom surface thereof, the inwardly flared sealing wall of the outer plug sealing against the seal on the exterior surface of the inner plug when the pour spout assembly is in the closed orientation.

15. The beverage container according to claim 13, the inwardly flared sealing wall of the outer plug being separated from the seal on the exterior surface of the inner plug by an annular ring pathway that is in fluid communication with the interior volume when the pour spout assembly is in the open orientation.

16. The beverage container according to claim 1, the outer plug further comprising a seal disposed on an exterior surface of the outer plug proximate a bottom surface thereof, the seal disposed on the exterior surface of the outer plug sealing the pour spout assembly to the container body.

17. The beverage container according to claim 1, wherein the beverage container body is a double walled container.

18. A beverage container comprising:
   a container body defining an opening and having an interior volume; and,
   a 360° pour spout assembly removably coupled to the container body, the pour spout assembly providing access to the interior volume and having open and closed orientations, the pour spout assembly comprising an outer plug and an inner plug at least partially received within the outer plug,
   the outer plug being removably coupled to the container body; and
   the inner plug being displaceable along a longitudinal container body axis and removably coupled to the outer plug,
   wherein the inner plug further comprises a top portion, a body, and a residual seal between the top portion and the body, the residual seal sealing against an inner surface of the outer plug when the pour spout assembly is in the closed orientation.

19. The beverage container according to claim 18, wherein the residual seal comprises an outwardly flared annular wall.

20. A method of pouring a liquid from a beverage container, the method comprising:
   providing a beverage container comprising a container body defining an opening and having an interior volume and a 360° pour spout assembly removably coupled to the container body, the pour spout assembly providing access to the interior volume and having open and closed orientations, the pour spout assembly comprising an outer plug and an inner plug at least partially received within the outer plug, the outer plug being removably coupled to the container body, and the inner plug being displaceable along a longitudinal container body axis and removably coupled to the outer plug, the beverage container further comprising a circumferential stop rib on an inner surface of the outer plug and one or more retaining members extending from a bottom surface of the inner plug;

positioning the pour spout assembly in the open orientation, wherein positioning the pour spout in the open orientation comprises rotating the inner plug, thereby causing the inner plug to move slightly along the longitudinal container body axis based on a threaded connection between the inner plug and the outer plug, such that the one or more retaining members extending from a bottom surface of the inner plug is engaged with the circumferential stop rib on an inner surface of the outer plug; and, pouring a liquid from the beverage container.

* * * * *